United States Patent
Dealy

(10) Patent No.: US 6,801,625 B1
(45) Date of Patent: Oct. 5, 2004

(54) APPARATUS AND METHOD FOR STRIPPING PARITY BITS FROM AN INPUT STREAM

(75) Inventor: Sheldon R. Dealy, Lake Oswego, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/456,305

(22) Filed: Dec. 8, 1999

(51) Int. Cl.[7] .......................... H04L 9/00; H04K 1/00; G06F 11/00; H04M 11/00; G11C 29/00

(52) U.S. Cl. .............. 380/44; 380/28; 380/29; 380/37; 714/800; 714/801; 714/805

(58) Field of Search ................. 714/800, 801, 714/805; 380/44, 28, 29, 37

(56) References Cited

U.S. PATENT DOCUMENTS

| | | | | |
|---|---|---|---|---|
| 3,764,998 A | * | 10/1973 | Spencer ..................... | 713/600 |
| 5,675,617 A | * | 10/1997 | Quirk et al. ................ | 375/365 |
| 5,995,623 A | * | 11/1999 | Kawano et al. ............. | 713/189 |
| 6,275,587 B1 | * | 8/2001 | Amerige ..................... | 380/255 |
| 6,560,337 B1 | * | 5/2003 | Peyravian et al. ........... | 380/44 |
| 6,597,706 B1 | * | 7/2003 | Seery ......................... | 370/503 |

OTHER PUBLICATIONS

Bruce Schneier, Applied Cryptography, 1996, John Wiley and Sons, Inc, Second Edition, pp. 270–278.*

* cited by examiner

Primary Examiner—Kim Vu
Assistant Examiner—Allen S. Wu
(74) Attorney, Agent, or Firm—Pillsbury Winthrop LLP

(57) ABSTRACT

The disclosed parity stripping technique quickly and efficiently converts a multi-byte input stream having parity bits to an output data stream that contains the same data as the input stream but without the parity bits. The multi-byte input stream is indexed according to the number of times a loop is completed. During each iteration of the loop, a portion of the input steam having an associated parity bit, such as a byte of the input stream, has its parity bit set to zero and the portion of the input key is then shifted a number of bits equal to the number of times the loop has been completed. The shifted value is then logically ORed with the portion of the memory used to hold the output data stream.

19 Claims, 3 Drawing Sheets

APPARATUS AND METHOD FOR STRIPPING PARITY BITS FROM AN INPUT STREAM

BACKGROUND OF THE INVENTION

1. Field of the Invention

The present invention relates generally to secure computer systems, and more particularly, to securing information transmitted between computer systems by encrypting the information.

2. Description of Related Art

Encryption, which is the conversion of information into a form that cannot be easily understood by unauthorized parties, is used extensively in modern computer networks to keep sensitive information, such as credit card numbers or confidential corporate information, from interception by the unauthorized parties. Encryption has become particularly important with the growth in popularity of large, relatively public networks such as the Internet.

Decryption converts encrypted information back into its original form. To convert the information back and forth between its encrypted and unencrypted (plaintext) forms, a numerical code called an encryption key is used in combination with an encryption algorithm.

In operation, the party sending the information encrypts the plaintext information with the encryption algorithm and the key. The encrypted information is then transmitted over the insecure medium and decrypted by the receiving party using the encryption algorithm and the key. Although an intercepting party may know the encryption algorithm used by the sender and receiver, without the key, they will not be able to understand the encrypted data.

One well known encryption algorithm is the data encryption standard (DES) algorithm. DES applies a 56-bit key to 64-bit blocks of the data that is to be encrypted, to obtain 64-bit blocks of encrypted data.

Some DES key transmission protocols increase the length of the key from 56 bits (7 bytes) to 64 bits (8 bytes) by adding a parity bit to each 7 bit segment of the original 56 bit key. Parity refers to a technique of checking whether data has been lost or written over when it's transmitted between computers. The additional bit, the parity bit, is added to the 7 bit segment such that the sum of the bits before transmission is either even (even parity) or odd (odd parity). The receiving computer may then check the sum of each received byte to verify that the bits were not corrupted in transmission. A parity bit is not a perfect indicator of transmission error, because, for example, if two bits are corrupted during transmission, their errors may cancel each other out and the sum of the bits may still pass the parity check.

Before being used as a key to the DES algorithm, the 64-bit keys are stripped of their parity bits. Stripping a 64-bit key involves copying the 7-bit non-parity portion of each parity byte and concatenating the eight 7-bit portions to reform the original 56 bit key. It is desirable to perform this key stripping procedure as efficiently as possible.

SUMMARY

One aspect of the present invention is a method of stripping parity bits from an input stream. The method includes successively retrieving a portion of the input stream of a plurality of portions of the input stream. For each successively retrieved portion of the input stream, at least three acts are performed. To wit: (a) setting an additional bit of each said retrieved portion of the input stream to zero to obtain a zeroed value; (b) shifting the bits in the zeroed value a certain number of bits based on the position of the retrieved portion in the input stream; and (c) integrating the shifted bits into an output location.

A second aspect of the present invention is directed to a computer system. The computer system comprises a cryptographic engine, the cryptographic engine encrypting and decrypting information based on an encryption key. A processor is coupled to the cryptographic engine and the a memory. The memory stores instructions that when executed by the processor, cause the processor to convert an input encryption key including parity bits to an output encryption key that does not include parity bits by performing the tasks of (a) setting a parity bit of each portion of a plurality of portions of the input encryption key to zero to obtain a zeroed value; (b) shifting the bits in the zeroed value a certain number of bits based on the position of each portion in the input encryption key; and (c) integrating the shifted bits into a memory location that stores the output encryption key.

A third aspect of the present invention is directed to a computer-readable medium encoded with a plurality of processor-executable instruction sequences. The instruction sequences successively retrieve a portion of an input stream of a plurality of portions of the input stream, each portion including at least seven bits plus an additional parity bit. For each successively retrieved portion of the input stream, at least the following acts are performed: (a) setting the additional bit of each said retrieved portion of the input stream to zero to obtain a zeroed value; (b) shifting the bits in the zeroed value a certain number of bits based on the position of the retrieved portion in the input stream; and (c) integrating the shifted bits into an output location.

BRIEF DESCRIPTION OF THE DRAWINGS

The accompanying drawings, which are incorporated in and constitute a part of this Specification, illustrate an embodiment of the invention and, together with the description, explain the objects, advantages, and principles of the invention. In the drawings.

DETAILED DESCRIPTION

The following detailed description refers to the accompanying drawings that illustrate the embodiments of the present invention. Other embodiments are possible and modifications may be made to the embodiments without departing from the spirit and scope of the invention. Therefore, the following detailed description is not meant to limit the invention. Rather the scope of the invention is defined by the appended claims.

As described herein, a parity stripping technique quickly and efficiently converts a multi-byte input stream having parity bits to an output data stream that contains the same data as the input stream but without the parity bits.

Figure 1:
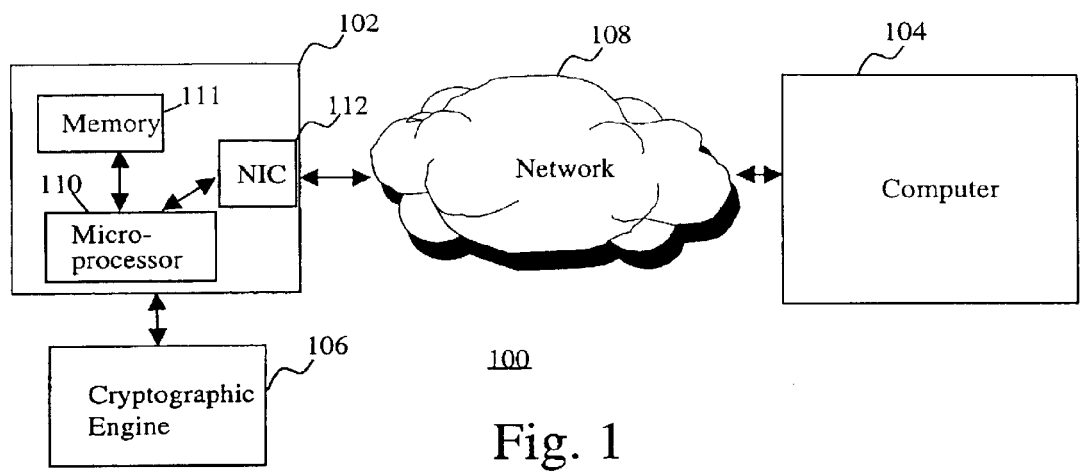
FIG. 1 is a diagram of an exemplary computer system in which parity bit stripping is performed.

FIG. 1 is a diagram of an exemplary computer system on which parity bit stripping may be performed. Computer system 100 includes a first computer 102 and second computer 104 that may communicate with one another over network 108. Each of computers 102 and 104 include a microprocessor 110 operatively coupled to a computer memory 111. A network card interface (NIC) 112 interfaces the computers 102 and 104 to network 108. Network 108, may be, for example, the Internet. To engage in secure communication over non-secure network 108, computers 102 and 104 encrypt their network transmissions.

Communication between computers 102 and 104 may be implemented using any of a number well known computer networking models, such as a client/server or a pier-to-pier network model. Computers 102 and 104 can be any of a number of well known computer systems, such as a personal computer based on microprocessors from Intel Corporation, of Santa Clara, Calif.

Cryptography engine 106, which is connected to computer 102, is a hardware accelerator designed to assist computer 102 in encrypting and decrypting data. Cryptography engine 106 implements, in hardware, cryptographic algorithms such as DES. In this manner, cryptography engine 106 is able to quickly decrypt and encrypt data for computer 102, thus saving microprocessor 110 from absorbing the computational overhead required by the encryption algorithm. This is useful because cryptographic algorithms tend to be relatively computationally burdensome.

Although cryptography engine 106 is shown in FIG. 1 as being connected to computer 102, engine 106 may be integrated into computer 102 in the sense that engine 106 may be implemented on the motherboard with CPU 110 or in network interface card 112. Also, the cryptographic function may be carried out by the computer itself, even though it may be less efficient to do so.

Figure 2:
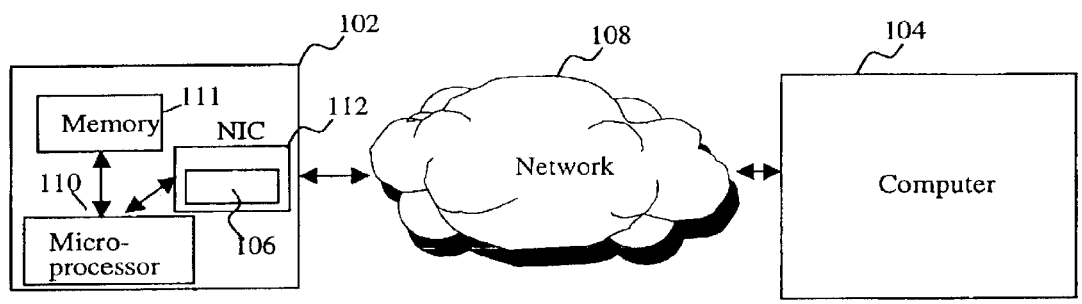
FIG. 2 is diagram of an exemplary computer system in which parity bit stripping is performed in a network interface card.

FIG. 2 is diagram of a computer system similar to computer system 100, but in which engine 106 is implemented on NIC 112. Engine 106, when implemented as a part of NIC 112, can be used to encrypt all data being received from or transferred to selected computers on network 108. In this manner, although network 108 is not a secure network, by automatically encrypting all data, computer 102 nevertheless effectively communicates in a "virtual private network" (VPN).

Computers 102 and 104 may either accept program instructions from a computer storage device (e.g., optical or magnetic disk) or from a network or communications interface. BIOS code (i.e., computer instructions) causing the system to implement the disclosed techniques may be programmed into a non-volatile portion of computer memory 111. The BIOS may be programmed when the system is manufactured or may be later delivered via a computer readable medium.

Cryptography engine 106 may be, for example, any hardware implementation of an encryption algorithm. Because a number of suitable encryption algorithms are known in the art, their implementation in hardware is well within the skill of one of ordinary skill in the art.

In operation, before computers 102 and 104 can begin encrypted communication with one another, they must first decide on the key and the type of encryption algorithm to use. This information is typically exchanged with a security association (SA). A security association is a relationship between two or more computers that describe how the computers will use security services to communicate securely. The negotiation, promulgation, and management of security associations are well known in the art and will not be described in detail. One known protocol for dealing with security associations is the Internet Security Association and Key Management Protocol, which is described in more detail in the Internet "Request for Comments" publication RFC2408.

As previously mentioned, encryption keys are negotiated and transmitted with parity bits. Often, however, the entity actually performing the encryption/decryption function requires the key to be represented without the parity bits. Cryptography engine 106, for example, to implement DES encryption, may require that the DES key be supplied as a 56-bit (7 byte) key in which each bit is part of the substantive encryption key. Accordingly, the received DES encryption keys are converted by CPU 110 or NIC 112 from the received 64-bit parity inclusive key, to the required 56-bit non-parity key.

Processes consistent with embodiments of the present invention for converting a 64-bit parity key into a parity stripped 56-bit key will now be described in detail with reference to FIGS. 3 and 4.

Figure 3:
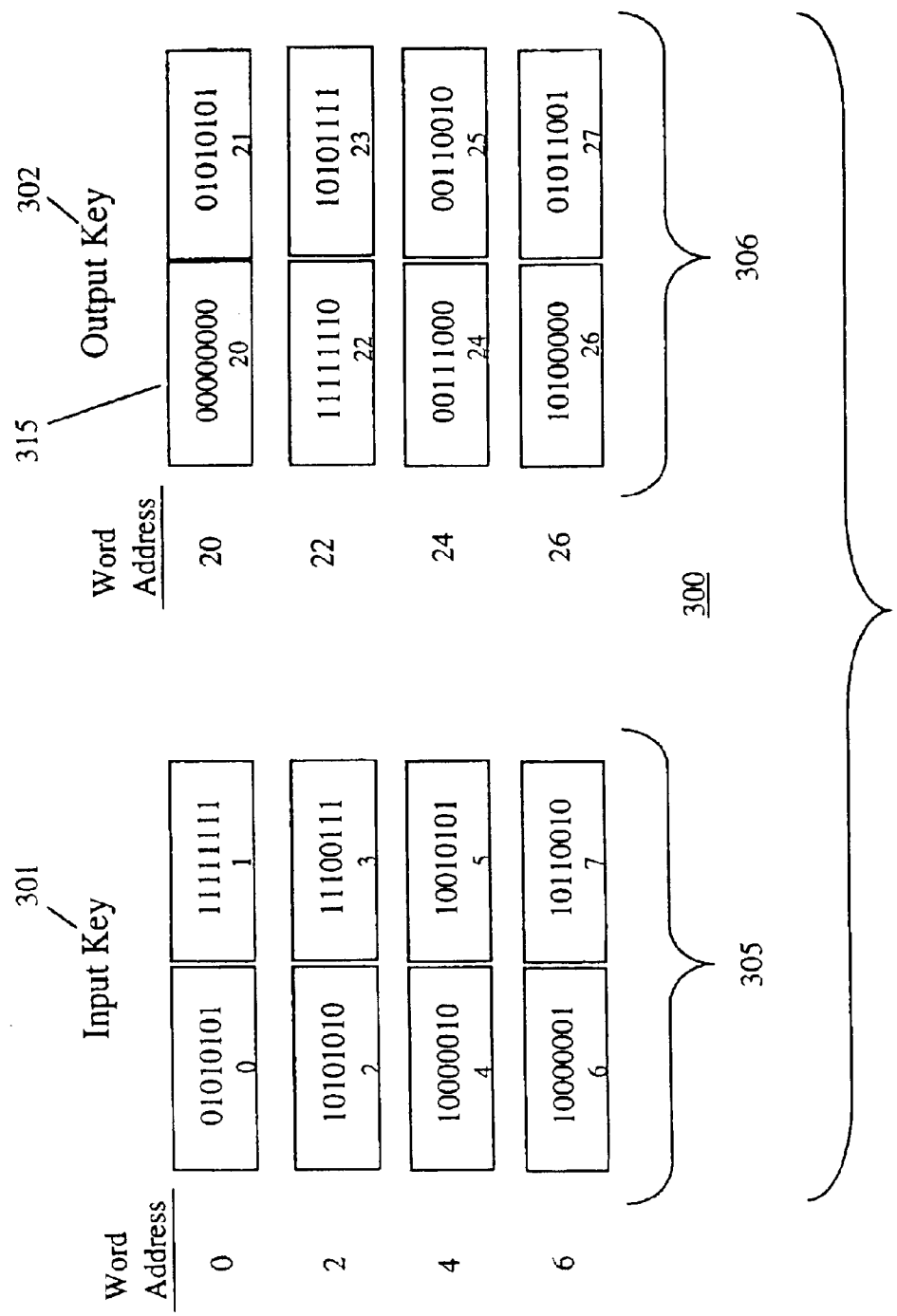
FIG. 3 is an illustrative memory map of a portion of the memory in the computers shown in FIGS. 1 and 2.

FIG. 3 is an illustrative memory map 300 of a portion of memory 111 in computer 106. The 64-bit parity inclusive key is labeled as input key 301 and the parity stripped 56-bit output key (plus a leading null byte 315) is labeled as output key 302. Input key 301 and output key 302 are stored in memory byte groups 305 and 306, respectively. The memory bytes in input key 301 have exemplary addresses 0–7, while the bytes in output key 302 have exemplary addresses 20–27. In this illustration, each byte comprises half of a 16-bit word of computer 106. The four words shown in input key 301 are addressed as addresses 0, 2, 4, and 6. The four words shown in output key 302 are addresses as addresses 20, 22, 24, and 26.

Throughout this disclosure, the memory addresses shown in FIG. 2 will be interpreted using the little endian convention, which means that low address bytes 306 in each word is the least significant byte of the word. Other memory address interpretation schemes, such as the big endian convention, may alternatively be used. Within each byte, the rightmost bit, which is interpreted as the least significant bit of the byte, is used to store the parity bit. As shown, bytes in input key 301 are given even parity.

Although memory 300 is shown as a little endian memory using words two bytes in length, one of ordinary skill in the art will recognize that memory 111 could also be organized as a big endian memory and that the number of bytes to each computer word could be increased or decreased. Additionally, although input key 301 uses even parity, input key 301 could also be odd parity.

Figure 4:
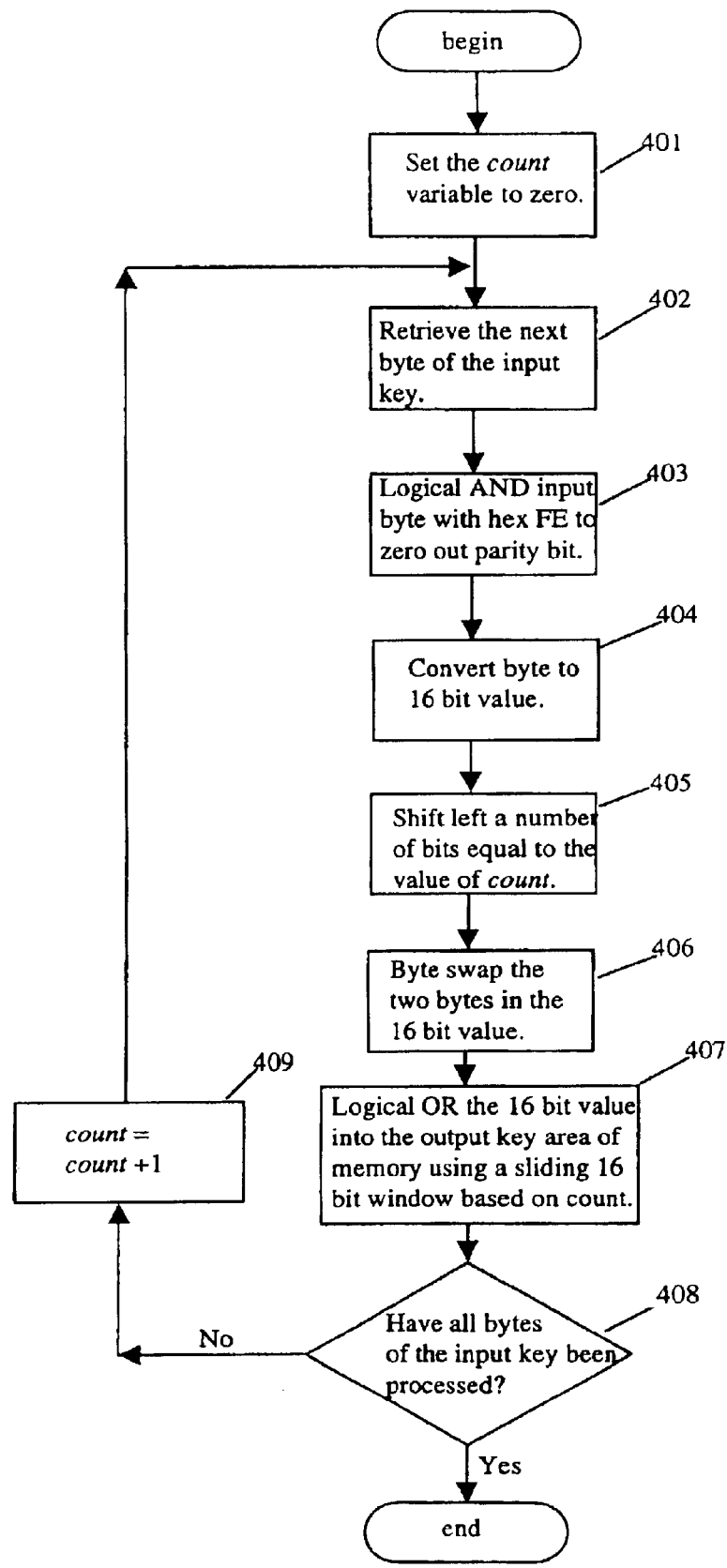
FIG. 4 is a flow chart illustrating a process for converting an input key containing parity bits into a parity stripped output key.

FIG. 4 is a flow chart illustrating a process for converting input key 301 to parity stripped output key 302. In general, the process involves indexing the input as a byte value according to the number of times a loop is completed. During each iteration of the loop, the input key's parity bit is set to zero and the input key is shifted a number of bits equal to the number of times the loop has been completed.

More particularly, as shown in FIG. 4, computer 106 begins by setting an indexing variable, called count, to zero. (Task 401). Computer 106 then retrieves the first byte of the input key, (task 402), and logical ANDs the retrieved byte with the Hexadecimal value FE (binary 11111110). (Task 403). This operation sets the least significant bit of the byte (i.e., the parity bit) to zero. The parity zeroed byte is then converted to a 16-bit number, (task 404), and all the bits in the 16-bit number are shifted to the left a number of bit positions equal to the value of count. (Task 405). Computer 106 then swaps the two bytes in the shifted 16 bit word. (Task 406). Finally, the 16-bit shifted and swapped value is logical ORed with the output key 302 at a location defined by sliding 16-bit window indexed by the count variable. (Task 407). In particular, the low byte in the sliding 16-bit window is equal to the value of count plus the offset to the first byte in output key 302 (e.g., the offset is 20 in FIG. 3). The loop defined by tasks 402–407 are repeated for each byte in the input key, with the value of count being incremented at successive iterations of the loop. (Tasks 408, 409).

Table I, below, visually illustrates successive states of computer 102 during the process shown in FIG. 4. For each state, the output key value and the result of the task being performed on the operational data is shown. For brevity, only three of the eight loops defined by tasks 402 through 407 are shown.

After completing the process in the row labeled state 1, computer 106 has retrieved the first byte of the input key. The output key is zeroed to eight zero bytes (although only the first four bytes are shown). The input byte: has its parity bit zeroed (state 2), is converted to a 16-bit number (state 3), is shifted by zero bits (i.e., no shift) (state 4), and is byte swapped (state 5). The resultant 16-bit number is logical ORed with the first two bytes (addresses 20 and 21 in FIG. 3) of the output key and the result stored in the output key (state 6). In the second iteration of the loop, the next input byte (binary 11111111) is similarly parity bit zeroed, converted to a 16-bit number, shifted left by one bit because at this point count equals one, and byte swapped. At state 12, the byte swapped 16-bit number is logically ORed with the second and third bytes of the output key (addresses 21 and 22 in FIG. 3).

As can be seen in the output key column of Table 1, at state 18, the output key includes an initial null byte of all zeroes, followed by 21 non-parity bits (seven from each iteration of the three shown iterations of the loop) of the input key. The final three bits of the fourth byte of the output key, which is shown as binary "000," will be filled in by the next iteration of the loop.

TABLE I

Intermediate Values Associated with the Tasks Performed in FIG. 3

| Computer State | Task Performed (from FIG. 3) | Output Key ↓ | Operational Memory |
|---|---|---|---|
| 1 | 402 (retrieve the next byte) | 00000000 00000000 00000000 00000000 | 01010101 |
| 2 | 403 (zero parity bit) | unchanged | 01010100 |
| 3 | 404 (convert to 16-bit value) | unchanged | 00000000 01010100 |
| 4 | 405 (shift left 0 bits) | unchanged | 00000000 01010100 |
| 5 | 406 (byte swap) | unchanged | 01010100 00000000 |
| 6 | 407 (logic OR to Output Key) | 00000000 01010100 00000000 00000000 | |
| 7 | 402 (retrieve the next byte) | unchanged | 11111111 |
| 8 | 403 (zero parity bit) | unchanged | 11111110 |
| 9 | 404 (convert to 16-bit value) | unchanged | 00000000 11111110 |
| 10 | 405 (shift left 1 bit) | unchanged | 00000001 11111100 |
| 11 | 406 (byte swap) | unchanged | 11111100 00000001 |
| 12 | 407 (logic OR to Output Key) | 00000000 01010101 11111100 00000000 | |
| 13 | 402 (retrieve the next byte) | unchanged | 10101010 |
| 14 | 403 (zero parity bit) | unchanged | 10101010 |
| 15 | 404 (convert to 16-bit value) | unchanged | 00000000 10101010 |
| 16 | 405 (shift left 2 bits) | unchanged | 00000010 10101000 |
| 17 | 406 (byte swap) | unchanged | 10101000 00000010 |
| 18 | 407 (logic OR to Output Key) | 00000000 01010101 11111110 10101000 | |

Although the above described parity stripping technique was explained in the context of converting a 64-bit parity inclusive input stream to a 56-bit parity stripped output of a DES encryption engine, one of skill in the art will recognize that concepts consistent with the present invention can be applied to input streams of other lengths and can be used with other encryption algorithms or any other application in which it is desirable to quickly and efficiently strip parity bits from an input stream.

It will be apparent to one of ordinary skill in the art that the embodiments as described above may be implemented in many different embodiments of software, firmware, and hardware in the entities illustrated in the figures. The actual software code or specialized control hardware used to implement the present invention is not limiting of the present invention. Thus, the operation and behavior of the embodiments were described without specific reference to the specific software code or specialized hardware components, it being understood that a person of ordinary skill in the art would be able to design software and control hardware to implement the embodiments based on the description herein.

The foregoing description of preferred embodiments of the present invention provides illustration and description, but is not intended to be exhaustive or to limit the invention to the precise form disclosed. Modifications and variations are possible consistent with the above teachings or may be acquired from practice of the invention. The scope of the invention is defined by the claims and their equivalents.

What is claimed:

1. A method of stripping parity bits from an input encryption key in a computer system comprising:
   successively retrieving a portion of the input encryption key of a plurality of portions of the input encryption key, each said portion including at least seven bits plus an additional parity bit;
   (a) setting the additional parity bit of each said retrieved portion of the input encryption key to zero to obtain a zeroed value;

(b) shifting the bits in the zeroed value a certain number of bits based on a position of retrieved portion in the input encryption key;

(c) integrating the shifted bits into an output location; and repeating (a), (b), and (c) for each said successively retrieved portion of the input encryption key.

2. The method of claim 1, wherein setting the additional bit of each said retrieved portion of the input encryption key to zero to obtain a zeroed value is performed by logically ANDing the retrieved value with a constant value.

3. The method of claim 1, further including converting the zeroed value into a 16-bit number before shifting the bits in the zeroed value the certain number of bits.

4. The method of claim 3, further including byte swapping the 16-bit number after shifting the bits in the zeroed value the certain number of bits and before integrating the byte-swapped shifted bits into an output location.

5. The method of claim 1, wherein the certain number of bits that the zeroed value is shifted is equal to a numerical position of the retrieved portion of the input encryption key.

6. The method of claim 1, wherein the integration of the shifted bits into the output location is performed by logically ORing the shifted bits with the output location at a position in the output location based on the position of the retrieved portion in the input encryption key.

7. A computer system comprising:

a cryptographic engine, the cryptographic engine to encrypt and decrypt information based on an encryption key;

a processor coupled to the cryptographic engine;

a memory to store instructions that are executed by the processor, the instructions, when executed, causing the processor to convert an input encryption key including parity bits to an output encryption key that does not include parity bits by performing the tasks of (a) setting a parity bit of each portion of a plurality of portions of the input encryption key to zero to obtain a zeroed value; (b) shifting the bits in the zeroed value a certain number of bits based on a position of each portion in the input encryption key; and (c) integrating the shifted bits into a memory location that stores the output encryption key.

8. The system of claim 7, wherein the cryptographic engine is implemented in a network interface card of the computer system.

9. The system of claim 7, wherein setting the parity bit of each said byte of the input encryption key to zero is performed by logically ANDing the retrieved byte with a constant value.

10. The system of claim 7, wherein the memory additionally stores instructions for converting the zeroed value into a 16-bit number before shifting the bits in the zeroed value the certain number of bits.

11. The method of claim 10, further including byte swapping the 16-bit number after shifting the bits in the zeroed value the certain number of bits and before integrating the byte-swapped shifted bits into an output location.

12. The system of claim 7, wherein the certain number of bits that the zeroed value is shifted is equal to a byte position of a corresponding byte of the input encryption key.

13. The system of claim 7, wherein the integration of the shifted bits into the memory location used to store the output encryption key is performed by logically ORing the shifted bits with the memory location at a position in the memory location based on a position of each said portion in the input encryption key.

14. An article of manufacture comprising a computer readable medium storing instructions that when executed by a processor:

(a) successively retrieve a portion of an input encryption key of a plurality of portions of the input encryption key, each said portion including at least seven bits plus an additional parity bit;

(b) set the additional parity bit of each said retrieved portion of the input encryption key to zero to obtain a zeroed value;

(c) shift the bits in the zeroed value a certain number of bits based on a position of the retrieved portion in the input encryption key;

(d) integrate the shifted bits into an output location; and repeat (b), (c), and (d) for each said successively retrieved portion of the input encryption key.

15. The article of manufacture of claim 14, wherein setting the additional bit of each said retrieved portion of the input encryption key to zero to obtain a zeroed value is obtained by logically ANDing the retrieved value with a constant value.

16. The article of manufacture of claim 14, further including converting the zeroed value into a 16-bit number before shifting the bits in the zeroed value the certain number of bits.

17. The method of claim 16, further including byte swapping the 16-bit number after shifting the bits in the zeroed value the certain number of bits and before integrating the byte-swapped shifted bits into an output location.

18. The article of manufacture of claim 14, wherein the certain number of bits that the zeroed value is shifted is equal to a numerical position of the retrieved portion in the input encryption key.

19. The article of manufacture of claim 14, wherein the integration of the shifted bits into the output location is performed by logically ORing the shifted bits with the output location at a position in the output location based on a position of the retrieved portion in the input encryption key.

* * * * *